United States Patent

Ido et al.

[11] Patent Number: 5,609,684
[45] Date of Patent: Mar. 11, 1997

[54] CURING VESSEL IN A GEL-COATED SEED PROCESSING DEVICE

[75] Inventors: Yoichi Ido; Yasushi Kohno, both of Susono, Japan

[73] Assignee: Yazaki Corporation, Tokyo, Japan

[21] Appl. No.: 562,815

[22] Filed: Nov. 27, 1995

[30] Foreign Application Priority Data

Nov. 29, 1994 [JP] Japan .................................. 6-294261

[51] Int. Cl.$^6$ ...................................................... A23G 3/00
[52] U.S. Cl. ............................... 118/13; 118/19; 118/303; 118/423
[58] Field of Search ................... 118/13, 19, 24, 118/26, 303, 417, 423; 427/4, 212

[56] References Cited

U.S. PATENT DOCUMENTS

| 4,079,696 | 3/1978 | Weber | 118/417 |
| 5,107,787 | 4/1992 | Kouno | 118/26 |
| 5,509,963 | 4/1996 | Kohno | 118/303 |

FOREIGN PATENT DOCUMENTS 62-266137  11/1987  Japan .
63-197530  8/1988  Japan .

*Primary Examiner*—Laura Edwards
*Attorney, Agent, or Firm*—Nikaido, Marmelstein, Murray & Oram LLP

[57] ABSTRACT

The present invention provides a gel-coated seed processing device that comprises a gel-processing nozzle for coating the seed supplied thereto, a curing vessel which is disposed under the gel-processing nozzle and accommodate a curing agent for curing the surface of the gel-coated seeds, and a washing vessel for washing off the surface of the gel-coated seeds after being immersed in the curing vessel, wherein the curing vessel is composed of; a curing vessel main body for accommodating a gelatinizing agent in a receiving section thereof for receiving the gel-coated seeds dropped down thereto and in a gel conveying channel in connection with the receiving section, a pump for circulating the curing agent from the receiving section to the upstream thereof by way of the gel conveying channel, a rectifying plate disposed in the upstream of the receiving section to make the curing agent overflow the horizontal upper end brim thereof, and a horizontal guide wall extendedly disposed in the downstream side of the rectifying plate for horizontally guiding the overflown curing agent toward the downstream.

4 Claims, 10 Drawing Sheets

CURING VESSEL IN A GEL-COATED SEED PROCESSING DEVICE

BACKGROUND OF THE INVENTION

1. Field of the Invention

The present invention relates to a curing vessel in a gel-coated seed processing device, in which the surface of each gel-coated seed coated by a polymeric gel is immersed into a curing agent, and thereafter the curing agent coated thereon is washed off.

2. Description of the Prior Art

Conventionally, it has been a very common process to sow seeds without coating them. However, there have also been seeds whose external surface are coated for the protection purpose.

In fact, there have been developed coated seeds heretofore in which the seeds are coated by powder agent or the like, but its principal object has been to enable an easy sowing of seeds by a sowing machine or the like, whereby sowing of already germinating seeds could not be done by currently used sowing machines.

The coating apparatus of this kind generally adopts a method in which an adhesive agent called "binder" is sprayed onto the surface of seeds and thereafter a coating agent is attached thereto by a rotary drum or the like to form a coating layer therearound by relatively a large scale of processing facility, so that although this is suitable for processing a large quantity of seeds, it is not appropriate for a small scale of process proceeded in a private farmer house or the like.

Alternatively, there have also been developed encapsulating apparatuses for enclosing seed-like materials with a polymeric gel as disclosed in Japanese Patent Applications laid Open No. 62-266137, and also No.63-197530. However, it has been a difficult problem to control the number of substances to be encapsulated, the diameter of a capsule, solidity of gel-coated layer and so on, as the substances are first scattered in a gelatinizing agent to be dropped in a curing agent in both cases.

SUMMARY OF THE INVENTION

The present invention has been made to solve the above-mentioned problems, and accordingly, it is an object of the present invention to provide gel-coated seeds, wherein the external surface of the seeds are coated by a polymeric transparent gel layer which is sphericalized, and enlarged for an easy seeding by sowing machines to increase an yield of sowing, whereby it is enabled to stabilize an elementary growing period of farm products which has been considered to be difficult, and reduce the quantity of seeds to be sowed to minimize an exertion of administrating labor such as thinning out and so on.

In order to accomplish the above objective, the present invention provides a gel-coated seed processing device that comprises a gel-processing nozzle for coating the seed supplied thereto, a curing vessel which is disposed under the gel-processing nozzle and accommodate a curing agent for curing the surface of the gel-coated seeds, and a washing vessel for washing off the surface of the gel-coated seeds after being immersed in the curing vessel, wherein the curing vessel is composed of; a curing vessel main body for accommodating a gelatinizing agent in a receiving section thereof for receiving the gel-coated seeds dropped down thereto and in a gel conveying channel in connection with the receiving section, a pump for circulating the curing agent from the receiving section to the upstream thereof by way of the gel conveying channel, a rectifying plate disposed in the upstream of the receiving section to make the curing agent overflow the horizontal upper end brim thereof, and a horizontal guide wall extendedly disposed in the downstream side of the rectifying plate for horizontally guiding the overflown curing agent toward the downstream.

It may be preferable to form a plurality of openings of a same shape at predetermined equal intervals at the upper end brim of the rectifying plate. Further, it can be also constructed such that it comprises a level adjusting mechanism composed of a tank base having an opening at the top end thereof for accommodating a curing agent therein, a connecting pipe connecting inside of the tank base and that of the curing vessel main body, and a reservoir tank containing a curing agent therein, whose downwardly directed opening is immersed in the curing agent of the tank base, whereby the level of the curing vessel main body is adjusted to be equal to the height of the lower end of the opening.

An operation of the curing vessel in the gel-coated seed processing device in connection with the device as a whole is such that it starts with forming a gel layer by opening a valve of a gel-processing nozzle. In a seed supplying mechanism, the seeds sucked from the container fall down to the gel layer, and the gel that has coated the seeds further fall down to the receiving section of the curing vessel disposed thereunder.

In the curing vessel, since there is formed a rectified flow directed to the conveying channel from the receiving section, the gel-coated seeds supplied to the receiving section reach the conveying channel after a predetermined lapse of time and are transported further to the washing vessel. As the gel-coated seeds are transported to the washing vessel at a substantially predetermined time, the solidity of the curing layer thereof can be controlled to prevent an inferior growth of the seeds. The gel-coated seeds transported to the washing vessel are first freed from the curing agent to be further sent, and the gel-coated seeds are separated from water in a device disposed thereunder so as to be collected therein.

A curing agent being contained inside the tank base and the reservoir tank, if the level of the curing agent inside the curing vessel is lowered, the level in the tank base is also lowered, so that the curing agent in the reservoir tank is supplied to the curing vessel. When the level of the curing agent in the curing vessel reaches to a predetermined level, the opening of the reservoir tank is immersed in the level of the tank base and closed thereby to stop supplying the curing agent.

By the operation as explained above, the level of the curing agent is automatically maintained always to a predetermined level.

Other features and advantages of the invention will be apparent from the following description taken in connection with the accompanying drawings.

DETAILED DESCRIPTION OF THE PREFERRED EMBODIMENTS

In the following, the structure of the gel-coated seed processing device of the present invention as a whole and a curing vessel contained therein are described with reference to the accompanying drawings.

Figure 7:
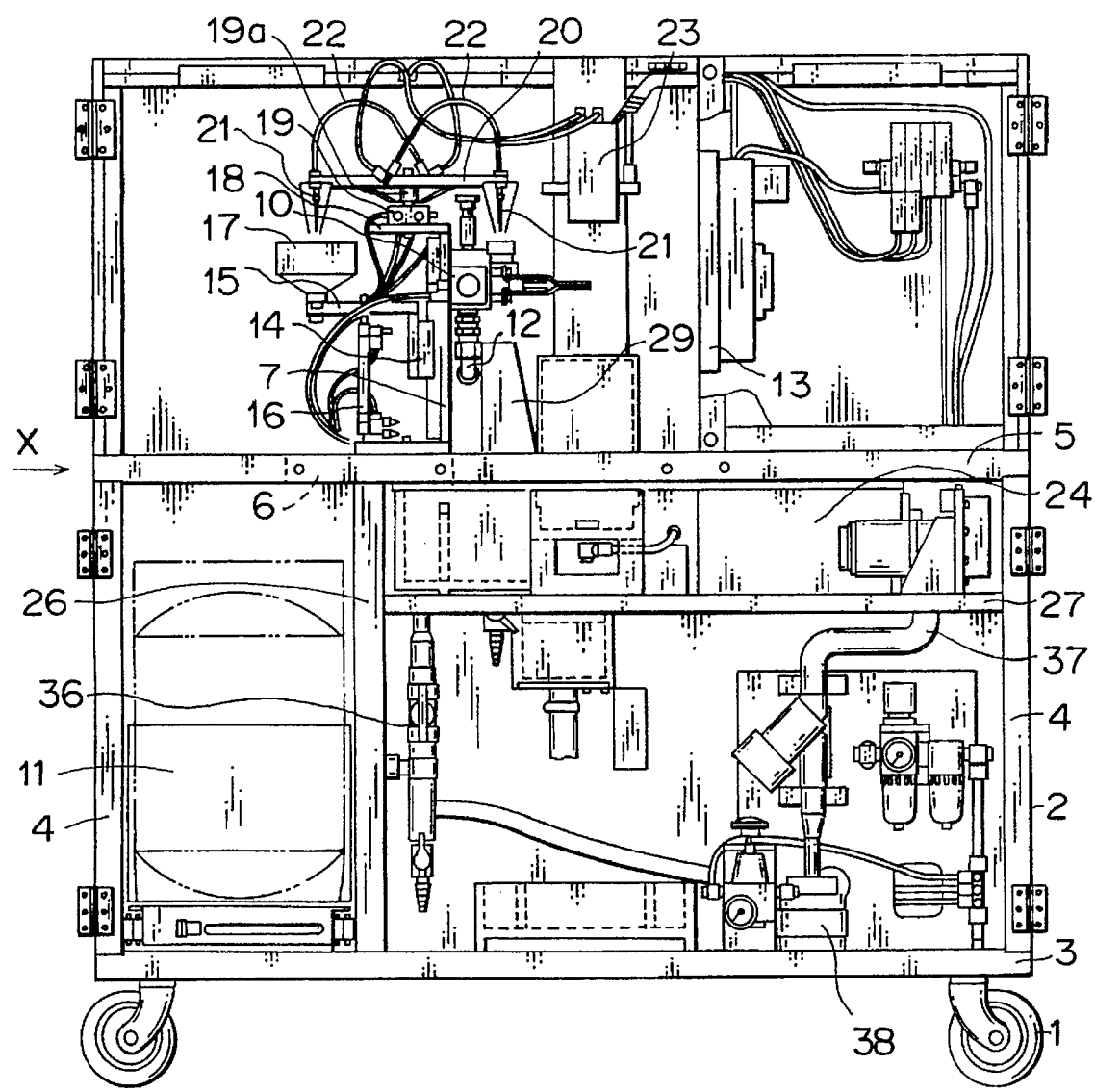
FIG. 7 is a front view of the gel-coated processing device with its covering removed.
Figure 8:
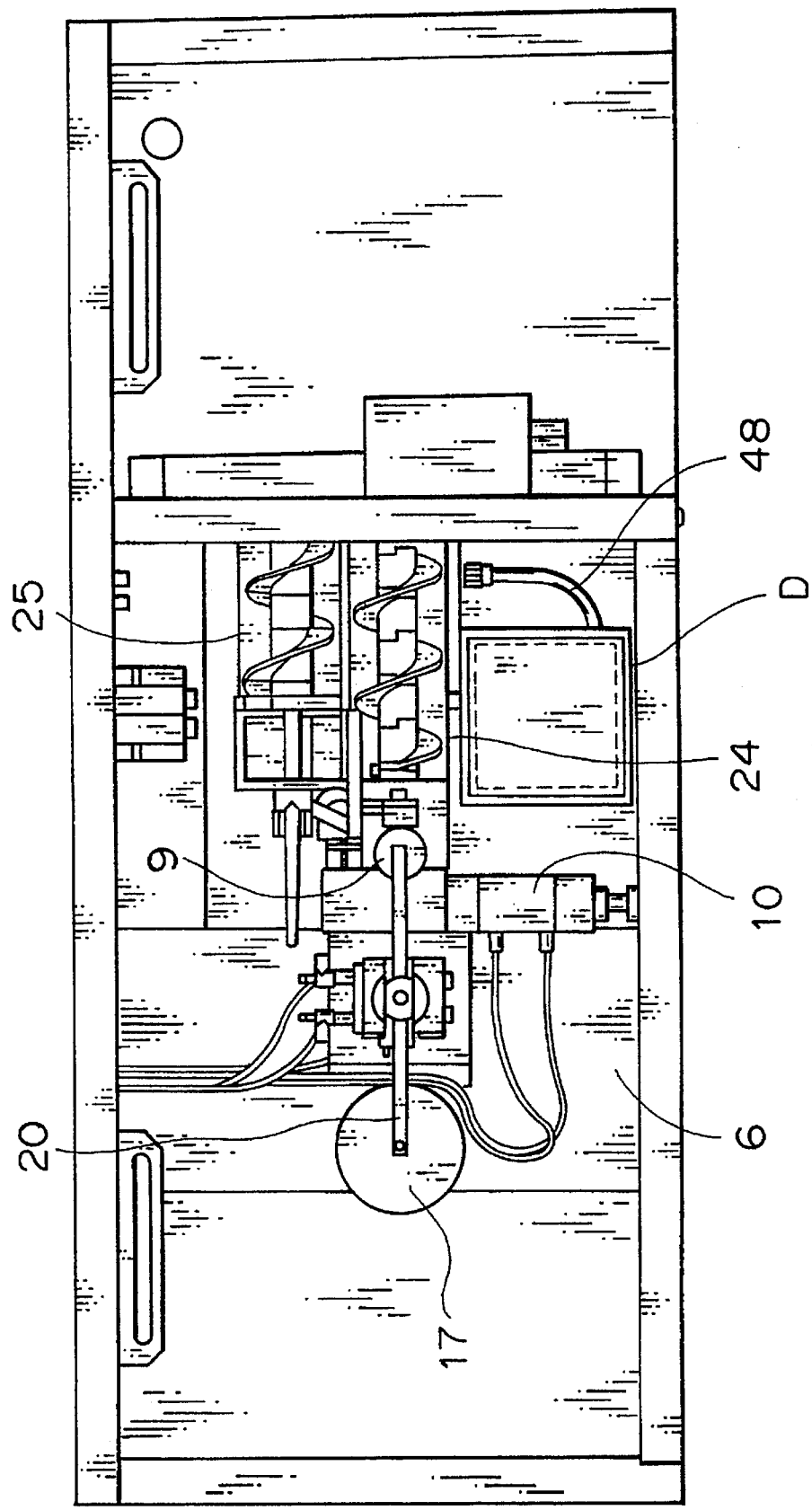
FIG. 8 is a plane view of the device of FIG. 7.
Figure 11:
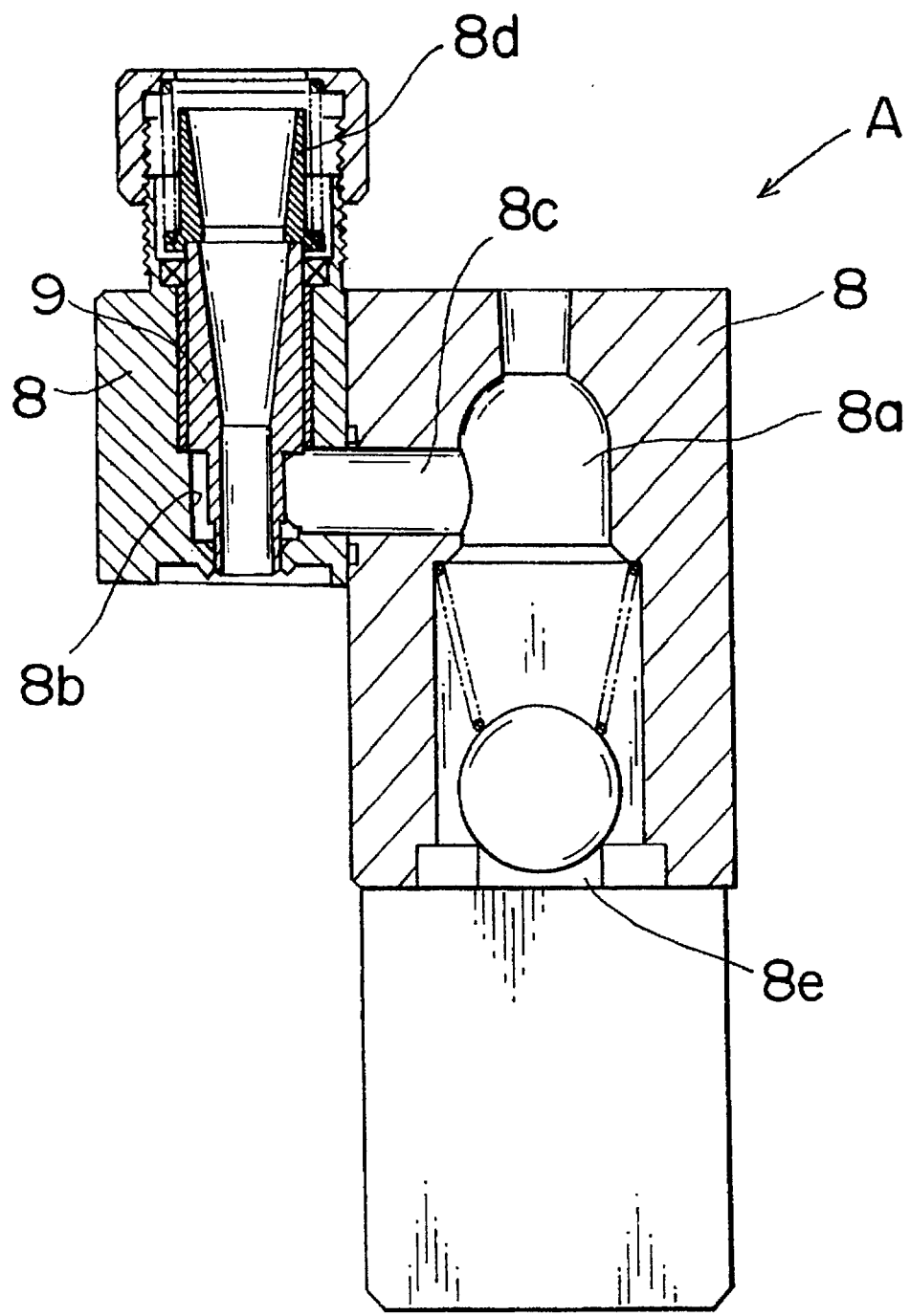
FIG. 11 is a longitudinal sectional view of the gel-processing nozzle.

FIG. 7 illustrates a front view of the gel-coated seed processing device which is stored in a casing 2 having casters 1, wherein a support plate 6 (refer to the plan view of FIG. 8) is disposed to an intermediate beam 5 which is mounted for interconnecting the intermediate portions of respective pillars 4, each of which stands respectively on the four corners of the bottom wall 3, and an open/close door (not shown) is also provided in the front portion thereof. On the support plate 6, a fixing base 7a mounted on the lower end section of the support pillar 7 is fixed with a screw, and a gel-processing nozzle A is firmly attached to the right side of the support pillar 7 (refer to FIG. 11).

The gel-processing nozzle A is constructed such that the nozzle main body 8 is provided with a gel accommodating section 8a therein for accommodating a gelatinizing agent, and a plunger insertion hole 8b vertically penetrating the nozzle main body 8 is connected with the gel accommodating section 8a by a gel flow channel 8c, wherein a plunger 9 is inserted in the plunger insertion hole 8b in a vertically movable form, and is urged downward by a spring 8d to close the gel flow channel 8c.

Figure 10:
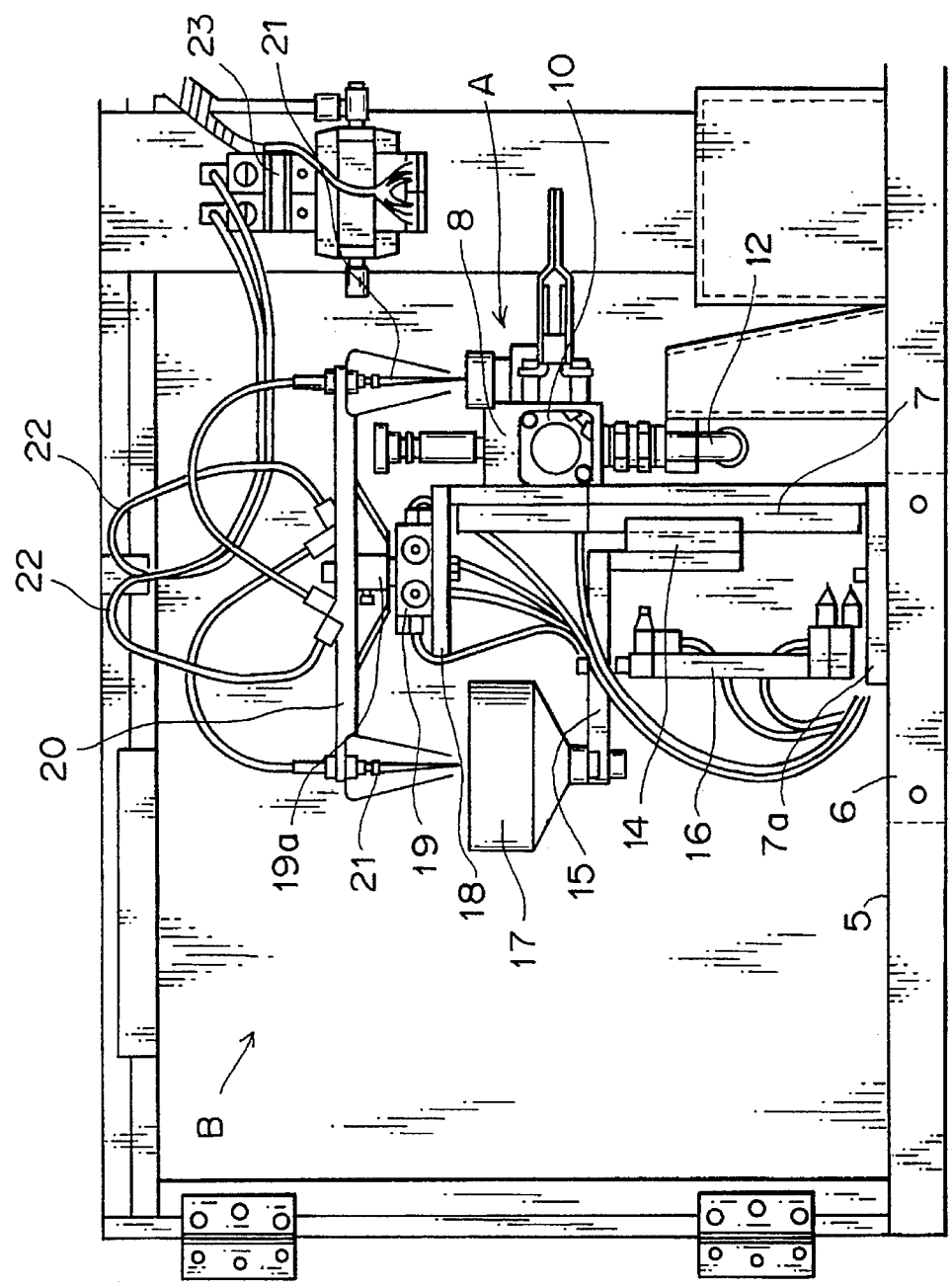
FIG. 10 is a partly enlarged view of the device of FIG. 7.

An air cylinder 10 is provided for pressurizing the gel accommodating section 8a (refer to FIG. 10), and a through 12 in connection with a gelatinizing agent tank 11 mounted on the bottom surface 3 (refer to FIG. 7) is coupled to a reverse flow prevention valve 8e. The gelatinizing agent tank 11 is constructed such that it can be removed from the casing 2 by a slide mechanism mounted to the bottom wall 13.

In accordance with an instruction from a controller stored in a control casing 13 mounted in the casing 2, a piston of the air cylinder 10 is activated to pressurize the gelatinizing agent stored in the gel accommodating section 8a, so that the tubular plunger 9 is moved upward to open the gel flow channel and the gelatinizing agent flown into the plunger insertion hole form a gel layer below the upwardly pushed plunger 9. When the piston of the air cylinder 10 is returned to the original position, a negative pressure is generated inside the gel accommodating section 8a, so that the gelatinizing agent in the gelatinizing agent tank 11 is sent to the through-pipe 12 and finally supplied to the gel accommodating section 8a by way of the reverse flow prevention valve 8a.

A container support member 15 is attached to a slide guide plate 14 provided at the left side of the support pillar 7 in a vertically slidable manner, and a free end of the piston of the air cylinder 16 mounted on the base plate 7a of the support pillar 7 is firmly attached to the container support member 15. A seed container 17 having an opening at its upper end is firmly attached to the uppermost portion of the container support member 15, wherein the seeds are accommodated in the seed container 17.

A rotary actuator 19 which is reciprocally rotated for an angle of 180 is mounted on an upper plate 18 fixed to the upper end portion of the support pillar 7, and provided at a rotary shaft 19a of the rotary actuator 19 is a central portion of the rotary arm 20. At the respective end portions of the rotary arm 20, tubular suction chips 21 are provided, and tubes 22 firmly attached to the top end of the respective suction chips 21 are both connected with an air pressure source and a negative pressure source by way of an electromagnetic valve 23.

The seed supply mechanism B constructed as above is operated such that when one of the suction chips 21 is situated right above the seed container 17, the other of the suction chips 21 is situated right above the tubular plunger 9 of the gel-processing nozzle A. When the seed container 17 is moved upward, a negative pressure is applied to the suction chip 21 and the seeds are sucked into the lower end of the suction chip 21, and thereafter when the rotary arm 20 is rotated for an angle of 180, an air pressure is supplied to the suction chip 21, so that the seeds are dropped into the plunger 9 of the gel-processing nozzle A so as to be placed on the gel layer whose central portion is already being sagged.

When the plunger 9 is opened again, the gel layer encloses the seeds supplied through the plunger together with air bubbles, whereby the gel layer containing the seeds falls down being unbearable with its increased weight, and is sphericalized due to its surface tension during its falling process, and then further supplied to the curing vessel disposed under the gel-processing nozzle. On the other hand, the gels which remained on the lower surface of the nozzle A without falling down form new gel layer to wait for next seeds to be supplied thereon.

Figure 1:
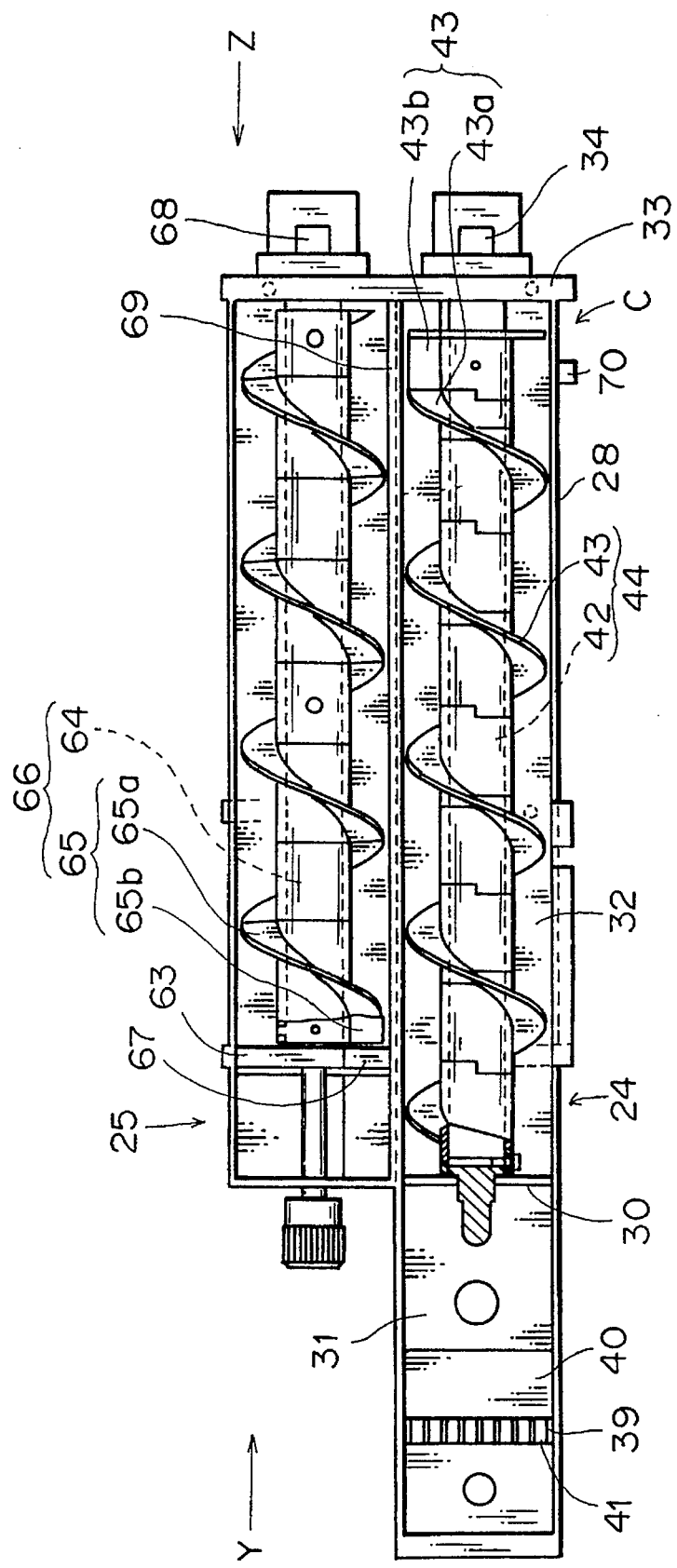
FIG. 1 is a plane view of a curing vessel and a washing vessel of a gel-coated seed processing device of the present invention.
Figure 2:
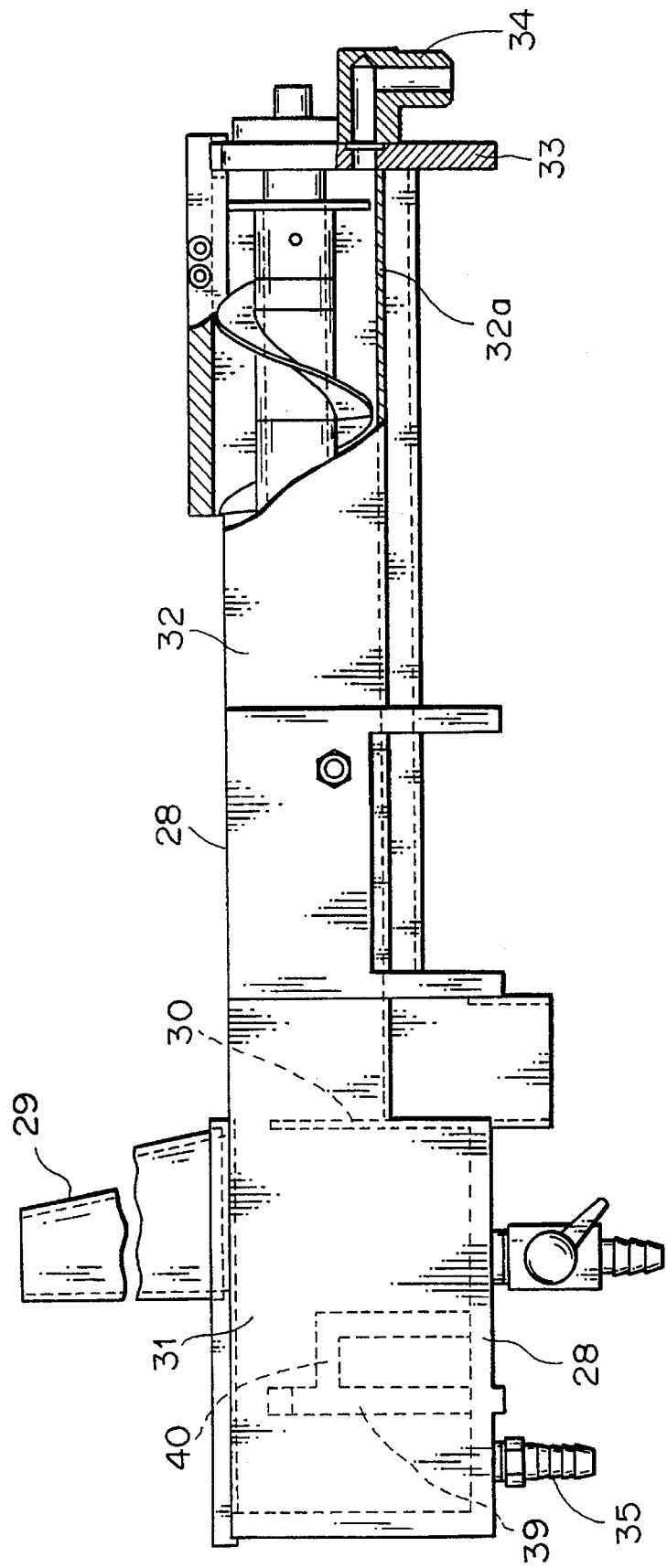
FIG. 2 is a front view of the device of FIG. 1.
Figure 3:
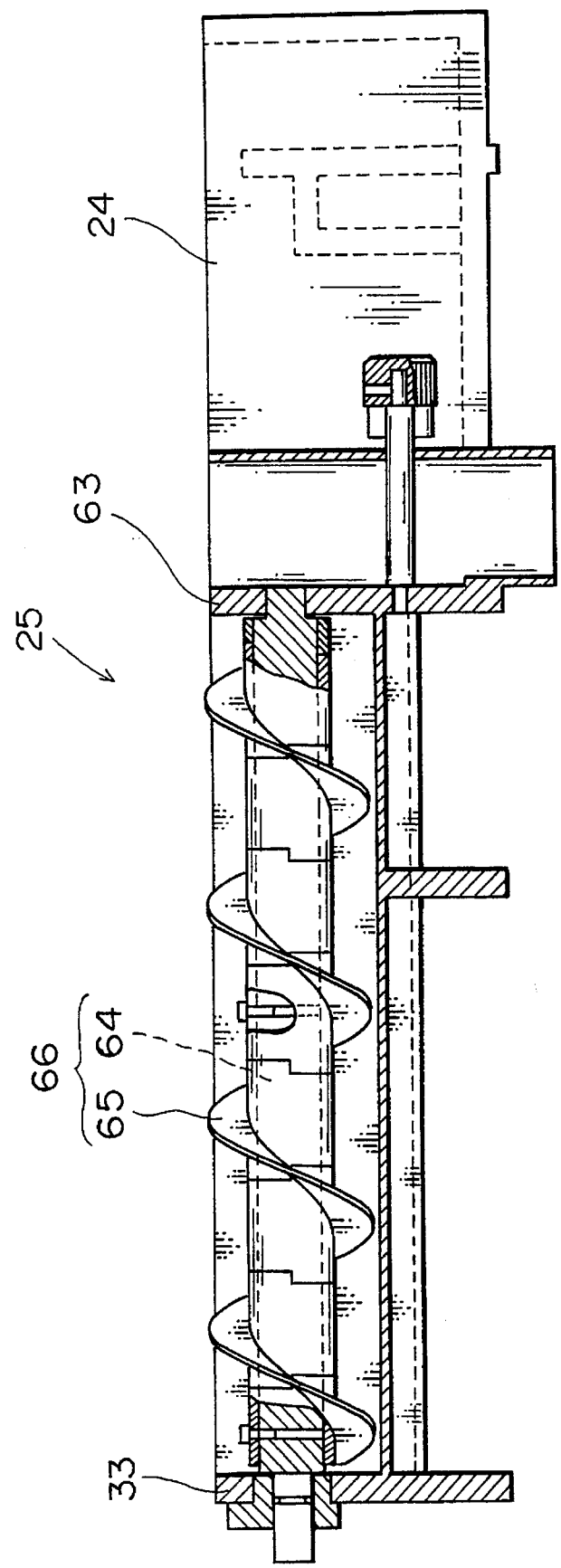
FIG. 3 is a rear side view of the device of FIG. 1.
Figure 4:
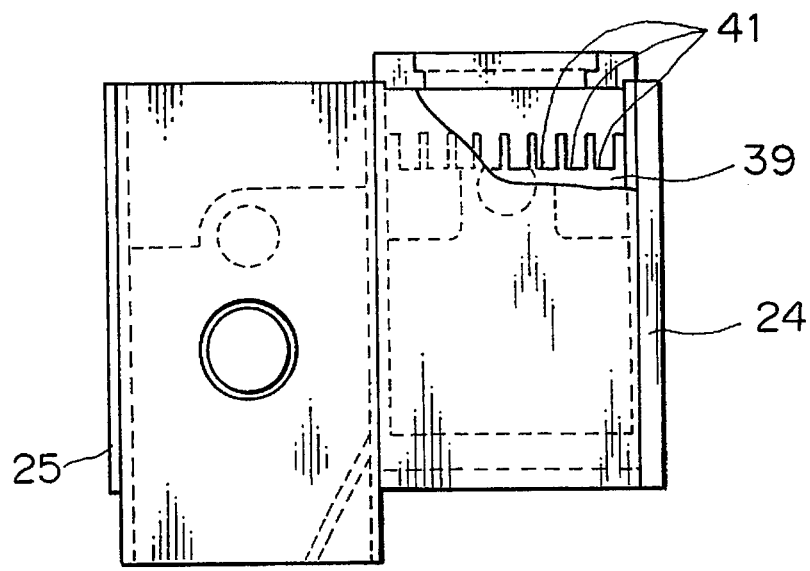
FIG. 4 is an illustration of the device of FIG. 1 viewed along with an arrow indicated by "Y"
Figure 9:
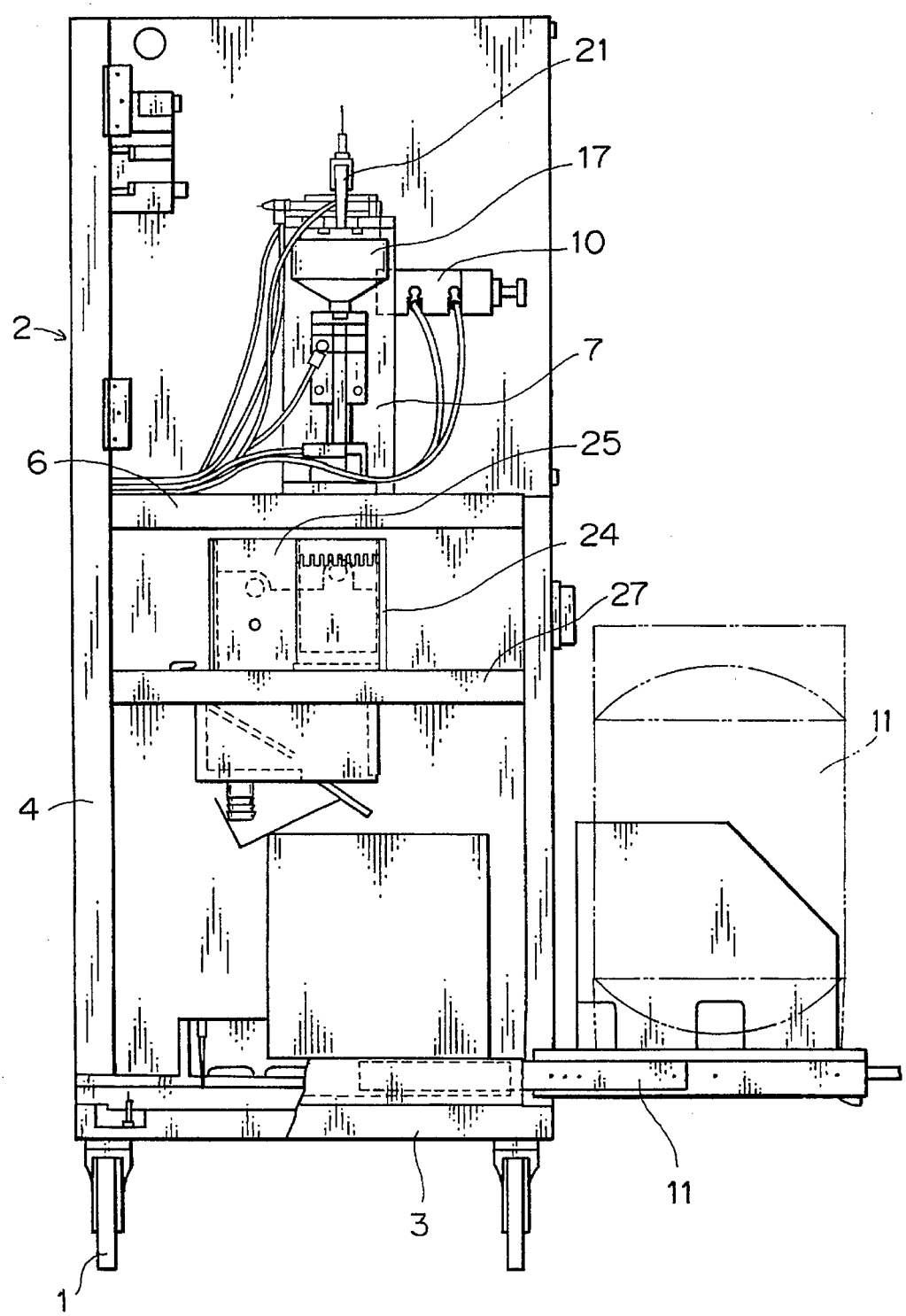
FIG. 9 is an illustration of the device of FIG. 7 viewed along with an arrow indicated by "X"

A curing vessel 24 and a washing vessel 25 are disposed on a mounting plate 27 which is provided interconnecting the pillars 4 at one lateral side of the casing and the lower pillars 26 provided between the intermediate beam 5 and the bottom wall 3 (refer to FIGS. 7 and 9). The curing vessel 24 is, as shown in FIGS. 1 and 2, constructed such that an elongated curing vessel main body 28 is formed with a guide cylinder 29 on the upper side thereof through which gel-coated seeds fall down, and that a separating wall 30 is formed under the right side end of the guide cylinder 29.

Figure 5:
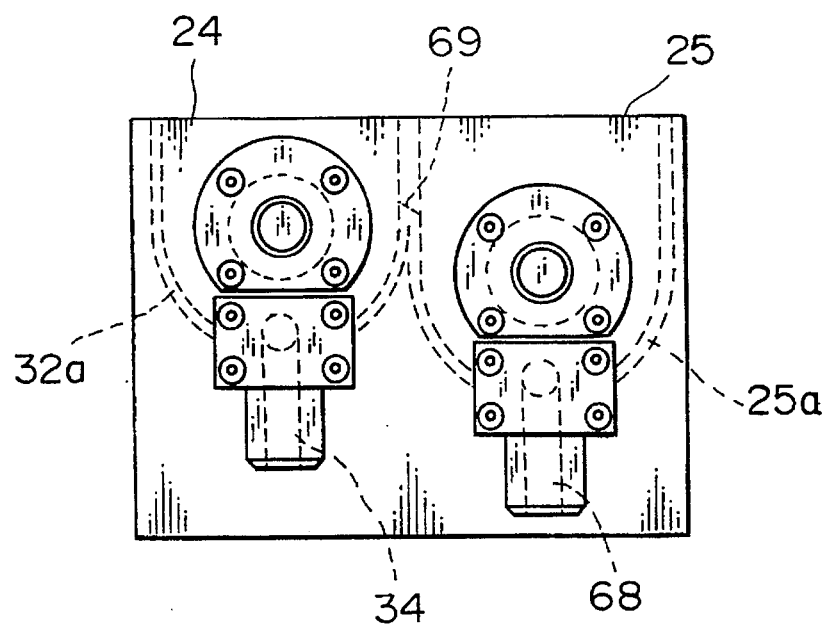
FIG. 5 is an illustration of the device of FIG. 1 viewed along with an arrow indicated by "Z"

The curing vessel main body 28 is also formed with a seed receiving section 31 which has a profound bottom in the left side of the separating wall 30, and provided at the right side of the separating wall 30 is a shallow-bottomed conveying channel 32 having a semi-circular bottom wall 32a as shown in FIG. 5.

Provided to a side wall 33 formed on the right side of the curing vessel main body 28 is an outlet tube 34, while on the left end of the bottom wall of the seed receiving section 31, an inlet tube 35 is provided (refer to FIG. 2), to which a valve 36 is further connected (refer to FIG. 7).

A pipe 37 connected with the outlet tube 34 is further connected with the valve 36 by way of a pump 38 mounted on the bottom wall 3 (refer to FIG. 7). On the bottom wall of the receiving section 31, a rectifying plate 39 is mounted upright on the right side of the inlet tube 35, wherein a horizontal guide wall 40 is rightwardly extended from the right side surface of the rectifying plate 39 (refer to FIG. 2). Since the upper end surface of the rectifying plate 39 and the upper surface of the horizontal guide wall 40 are both formed as horizontal planes, the amount of the curing agent overflown the uppermost surface of the rectifying plate 39 is leveled in the direction of the lateral width of the curing vessel main body 28.

On the upper end surface of the rectifying plate 39, if a plurality of rectifying openings 41 are formed in the direction of the lateral width of the curing vessel main body 28 at equal spaces, the curing agent flowing within the receiving section 31 becomes more rectified when the agent passes through these rectifying openings 41. However, without the horizontal guide wall 40, the curing agent overflown the uppermost surface of the rectifying plate 39 flows in whirls within the receiving section 31 due to the falling speed thereof, and thus a rectification of the flow of the curing agent cannot be properly operated. After all, the horizontal guide surface wall 40 is provided to prevent the curing agent from generating a swirl by guiding the overflown curing agent horizontally.

Since the upper end of the separating wall 30 is situated lower than the level of the curing agent accommodated in the curing vessel main body 28, the curing agent in the receiving section 31 is substantially rectified to be further supplied to the conveying channel 32. The opposite ends of the rotary shaft 42 are rotatably supported by the separating wall 30 and the side wall 33 respectively, and a cylindrically formed screw blade 43 having a spiral blade 43a on the external periphery thereof and a comb-up blade 43b at the right end thereof is disposed around the external surface of the rotary shaft 42. This rotary shaft 42 and the screw blade 43 compose together a screw feeder 44 of the curing vessel.

In the close proximity of the curing vessel 24, a tank base 46 having an opening 45 on the upper surface thereof is disposed, and installed in an aperture penetrating the external surface of the tank base 46 is a tube coupler 47 which is connected with the curing vessel 24 by way of a connecting pipe 48. A step 49 is provided around the upper end of the inner surface of the opening 45, and inside the tank base 46 a projection 50 is protrudedly formed toward the opening 45 (refer to FIG. 6).

Figure 6:
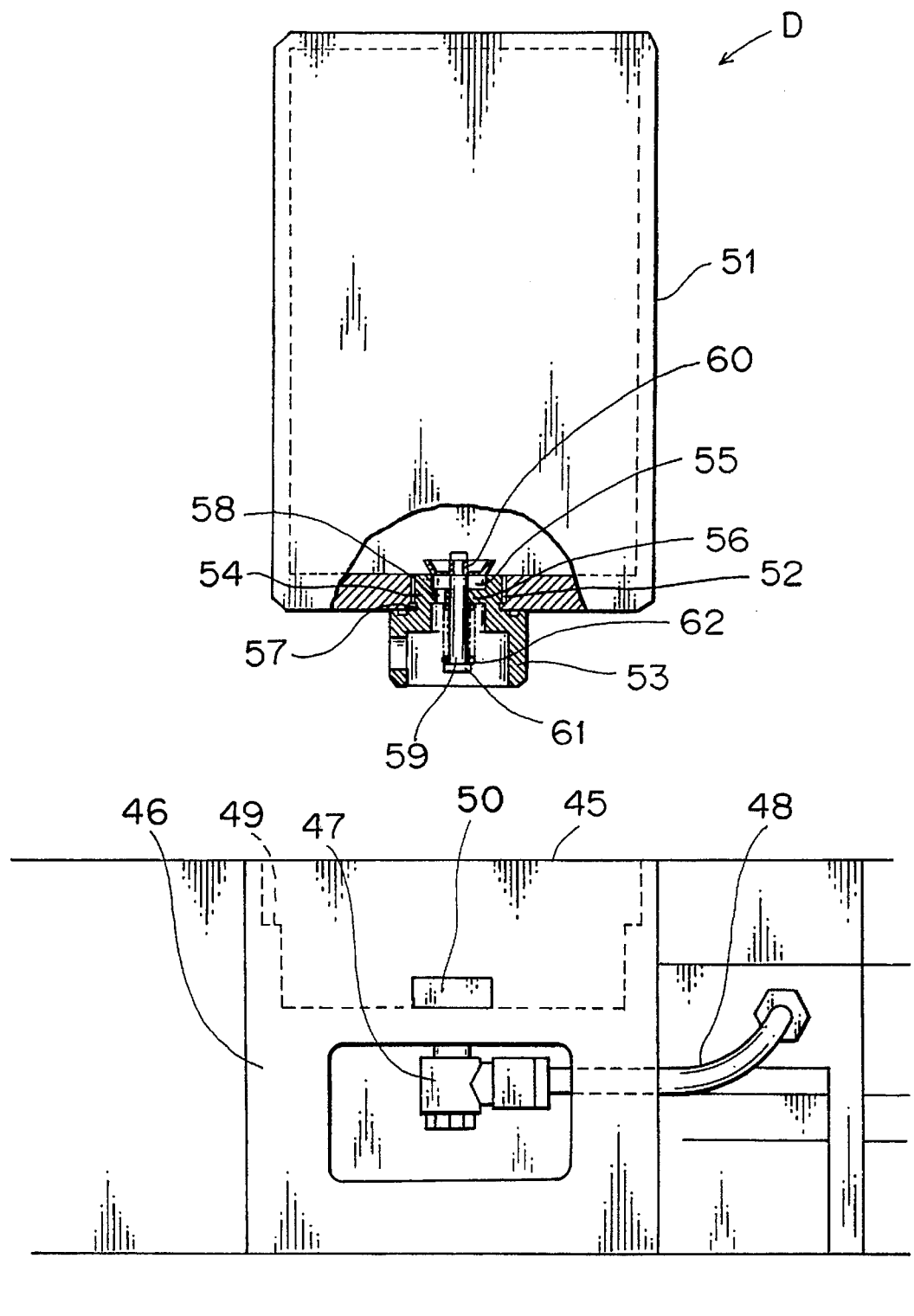
FIG. 6 is a partly broken front view of a level adjusting mechanism.

A reservoir tank 51 removably attached to the step 49 is, as shown in FIG. 6, formed with a screw hole 52 at the lower end portion thereof, and a male screw 54 formed on a cap 53 is helically engaged with the screw hole 52. The cap 53 is formed with a shaft guide wall 56 on the inner surface of the opening 55 penetrating the central portion thereof, and the shaft guide wall 56 is further formed with a shaft insertion hole 57 and a liquid supplying hole 58. A valve body 60 is firmly attached to one end of the valve shaft 59 inserted into the shaft guide wall 56, while a spring 62 is inserted between a flange 61 annularly formed around the other end of the valve shaft 59 and the shaft guide wall 56. Subsequently, the valve shaft 59 is urged downwardly, and the valve body 60 closes the top end of the opening 55, wherein when the reservoir tank 51 is placed on the step 49, the projection 50 of the tank base 46 is pressed against the valve shaft 59 to open up the valve body 80 (refer to FIG. 8).

All these components above compose a level adjusting mechanism D.

The washing vessel 25 integrally formed with the curing vessel 24 comprises a semi-circular bottom surface 25a (refer to FIG. 5) which is more profound than the curing vessel 24, and the side wall 33 of the curing vessel 24 also forms a right end side wall of the washing vessel 25 (refer to FIG. 1), wherein a rotary shaft 64 is rotatably supported by the thus formed right side wall 33 and an inner side wall 63 provided at the left side thereof.

A cylindrically formed screw blade 65 having a spiral blade 65a on the external periphery thereof and a comb-up blade 65b at the left end thereof is disposed around the external surface of the rotary shaft 64, and this rotary shaft 64 and the screw blade 65 compose a screw feeder 65 of the washing vessel altogether.

As shown in FIG. 1, a gel-coated seed transport channel 69 is formed at the right end of the curing vessel 24, which is constructed by notching one part of the upper surface of the boarder wall separating the curing vessel 24 from the washing vessel 25 (refer to FIG. 5), and at an opposite side of the washing vessel 25 an air pressurizing section 70 (FIG. 1) for supplying air pressure against the washing vessel 25 is provided, wherein the air pressurizing section 70 and the comb-up blade 43b of the screw feeder 44 holding the gel-coated seeds in the conveying channel 32 compose a gel-coated seed transport mechanism C for transporting the gel-coated seeds from the curing vessel 24 to the washing vessel 25 by way of the transport channel 69.

Furthermore, a dam 67 is formed at the upper end of the inner side surface 63 provided in the washing vessel 25, whereby water supplied from an inlet tube 68 formed on the side wall 33 is overflown over the dam 67. A gel-coated seed collecting device (not shown) is provided under the dam 87. It is to be noted that the right end portions of the rotary shafts 42 and 84 respectively of the curing vessel 24 and the washing vessel 25 are connected with a gear provided in a gear box (not shown) by way of coupling elements, whereby they are rotated in the opposite directions respectively.

An operation of the curing vessel 24 in the gel-coated seed processing device will now be explained in relation to the operation of the processing device as a whole.

In the gel-processing nozzle A, the piston of the air cylinder 10 is first activated thereby to push up the cylindrical plunger 9, so that the gelatinizing agent flown in to form a gel layer under the plunger 9. Thereafter, the suction chip 21 which is supplied a negative pressure sucks the seeds in the seed container 17, and the rotary arm 20 rotates for an angle of 180 to be positioned right above the cylindrical plunger 9. When the suction chip 21 is supplied an air pressure, the seeds sucked thereby beforehand fall down on the already sagging gel layer in the gel-processing nozzle A.

When the plunger 9 is again opened, the gel layer containing the seeds and air bubbles therein fall down due to its augmented weight, wherein the gel layer is sphericalized by a surface tension phenomenon during its falling term, and received by the receiving section 31 of the curing vessel 24 provided thereunder.

In the curing vessel 24, since there is formed a rectified flow from the receiving section 31 to the conveying channel 32, when the gel-coated seeds supplied to the receiving section 31 reach to the conveying channel 32 in substantially a predetermined time of lapse, carried by the screw feeder 44, and raised above the level of the curing agent by the comb-up blade 43b, they are transported to the washing vessel 25 through the gel-coated seed transport channel 69 by an air pressure injected from the transport mechanism C.

Since the rotation of the screw feeder 44 is constant, the time to be consumed for the gel-coated seeds to be transported from the receiving section 31 to the washing vessel 25 by way of the conveying channel 32 is also constant, whereby the solidity of the cured layer of the gel-coated seeds is controlled and thereby an inferior growth thereof is prevented.

The gel-coated seeds, after being transported by the screw feeder 66 and carried by the blade 65b upward, are flown over the dam 67 together with water, and separated from the water so as to be collected thereunder.

As the screw feeder rotates at a constant speed, the time to be consumed for washing the gel-coated seeds is also made constant, so that there will be no such occasion that the curing agent remains on the external surface of the gel-coated seeds to make the cured layer harder.

Since the curing agent is accommodated inside the reservoir tank 51 and the tank base 46, if the level of the curing agent within the curing vessel 24 is lowered, that of the tank base 46 is also lowered, so that the curing agent stored in the reservoir tank 51 is supplied to the curing vessel 24 through inside of the tank base 46, the tube coupler 47 and the tube 48.

When the level of the curing agent reaches to a predetermined level within the curing vessel 24, the opening 55 is immersed in the level of the tank base 46 to be closed, and a supply of the curing agent is stopped. Subsequently, the level of the curing agent is automatically maintained to a predetermined level.

Effect of the Invention

The following effects can be expected by the present invention constructed above;

(1) as a rectifying plate and a horizontal guide wall are provided in the upstream of the receiving section in the curing vessel, the curing agent transported from the receiving section to the conveying channel can be flown in a rectified mode.

Accordingly, the time to be consumed for the gel-coated seeds supplied from the receiving section to reach the conveying channel is constant.

Further, since the time to be taken for the gel-coated seeds to pass the conveying channel is constant, the time in which the gel-coated seeds are immersed in the curing agent is also constant, and thus the solidity of the cured layer formed on the surface of the gel-coated seeds is made constant, whereby the quality of the gel-coated seeds is equalized to eliminate the inferior growth of the seeds.

(2) as a level adjusting mechanism is provided in the curing vessel, the level of the curing agent within the curing vessel is automatically maintained to be constant, so that the gel-coated seeds are immersed in the curing agent in the same conditions, thereby to stabilize the quality of the gel-coated seeds.

Still further, no manual service to fill up the curing agent is required, and the gel-coated seed processing device can be continuously driven automatically.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A curing vessel for curing the surface of gel-coated seeds in a gel-coated seed processing device, said curing vessel comprising;

a curing vessel main body for accommodating a curing agent in a seed receiving section thereof for receiving gel-coated seeds dropped down thereto and in a conveying channel in connection with said receiving section, said seed receiving section and said conveying channel being partly separated by a separating wall, a pump for circulating the curing agent from said receiving section to the upstream thereof by way of said conveying channel, a rectifying plate having a horizontal upper end brim, said rectifying plate disposed in the upstream of said receiving section to make the curing agent overflow said horizontal upper end brim, and a horizontal guide wall extendedly disposed in the downstream side of said rectifying plate of horizontally guiding the overflown curing agent toward the downstream.

2. A curing vessel as claimed in claim 1, wherein said rectifying plate is further formed with a plurality of openings of a same shape at a predetermined equal intervals at the upper end brim thereof.

3. A curing vessel as claimed in claim 1, further comprising a screw feeder for sending the seeds to a washing vessel, said screw feeder comprising a rotary shaft rotatably supported by said separating wall and a side wall opposite thereto, and a screw blade formed around an external surface of said rotary shaft.

4. A curing vessel as claimed in claim 2 or 3, wherein said curing vessel further comprises a level adjusting mechanism composed of;

a tank base having an opening at the top end thereof for accommodating said curing agent therein, a connecting pipe connecting inside of said tank base and that of said curing vessel main body, and a reservoir tank containing said curing agent therein, whose downwardly directly opening is immersed in said curing agent in said tank base, thereby to equalize the level of the curing vessel to the lower end surface of said opening.

\* \* \* \* \*